United States Patent
Rodriguez

(10) Patent No.: US 7,048,419 B1
(45) Date of Patent: May 23, 2006

(54) AUXILIARY TRAILER LIGHTING SYSTEM

(76) Inventor: Joseph Rodriguez, 3559 Sparling St., San Diego, CA (US) 92115

( * ) Notice: Subject to any disclaimer, the term of this patent is extended or adjusted under 35 U.S.C. 154(b) by 0 days.

(21) Appl. No.: 10/914,064

(22) Filed: Aug. 9, 2004

(51) Int. Cl.
 *F21V 7/00* (2006.01)
(52) U.S. Cl. ............... 362/485; 362/540; 362/543; 362/544
(58) Field of Classification Search ........... 362/540, 362/545, 259, 485, 505, 543, 544; 340/475, 340/431, 468
See application file for complete search history.

(56) References Cited

U.S. PATENT DOCUMENTS

| | | | |
|---|---|---|---|
| 4,663,696 A | | 5/1987 | Miyazawa et al. |
| 4,896,251 A | * | 1/1990 | Fasel ................ 362/503 |
| 5,209,559 A | | 5/1993 | Ruppel |
| 5,428,512 A | | 6/1995 | Mouzas |
| 5,430,625 A | | 7/1995 | Abarr et al. |
| 5,682,138 A | * | 10/1997 | Powell et al. ........... 340/475 |
| D422,102 S | | 3/2000 | Moore |
| 6,095,663 A | * | 8/2000 | Pond et al. ............ 362/247 |
| 6,422,728 B1 | | 7/2002 | Riggin |
| D471,655 S | | 3/2003 | Brussing et al. |
| 6,543,917 B1 | | 4/2003 | Berlinghof |
| 6,604,834 B1 | | 8/2003 | Kalana |
| 6,970,074 B1 | * | 11/2005 | Perlman ............... 340/426.1 |
| 2003/0107900 A1 | | 6/2003 | Ellison |
| 2005/0225452 A1 | * | 10/2005 | Stephens et al. ....... 340/815.45 |

* cited by examiner

*Primary Examiner*—Sandra O'Shea
*Assistant Examiner*—Anabel Ton

(57) ABSTRACT

An auxiliary trailer lighting system includes a base plate that has a back side attached to a trailer. A top wall is attached to the plate and extends outwardly away therefrom. A lip is attached to the top wall. A reflective wall is attached to the lip and extends toward a bottom edge of the base plate. A translucent covering is removably attached to the lip and extends from the lip and over the reflective wall so that a first compartment is defined between reflective wall and the covering. At least two light emitters are mounted in the first compartment. A control is electrically coupled to a turn signal system and a running light system of a truck. The control is electrically coupled to the light emitters. The control turns on the light emitters when both of the running light and turn signal systems are turned on.

5 Claims, 6 Drawing Sheets

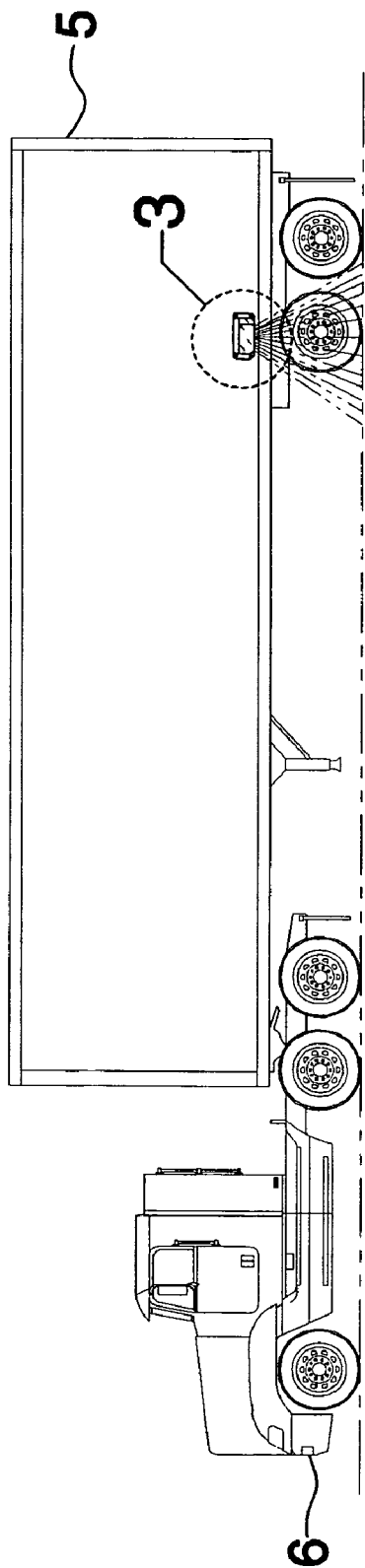
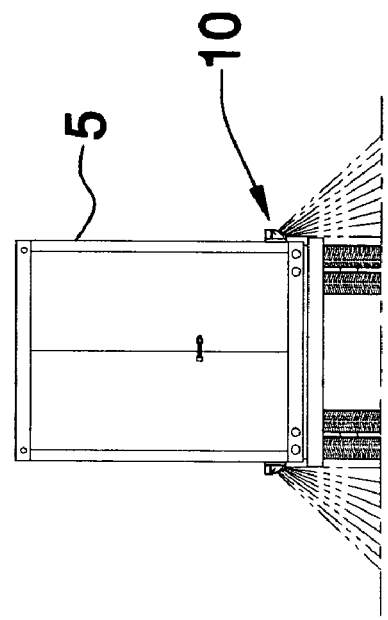

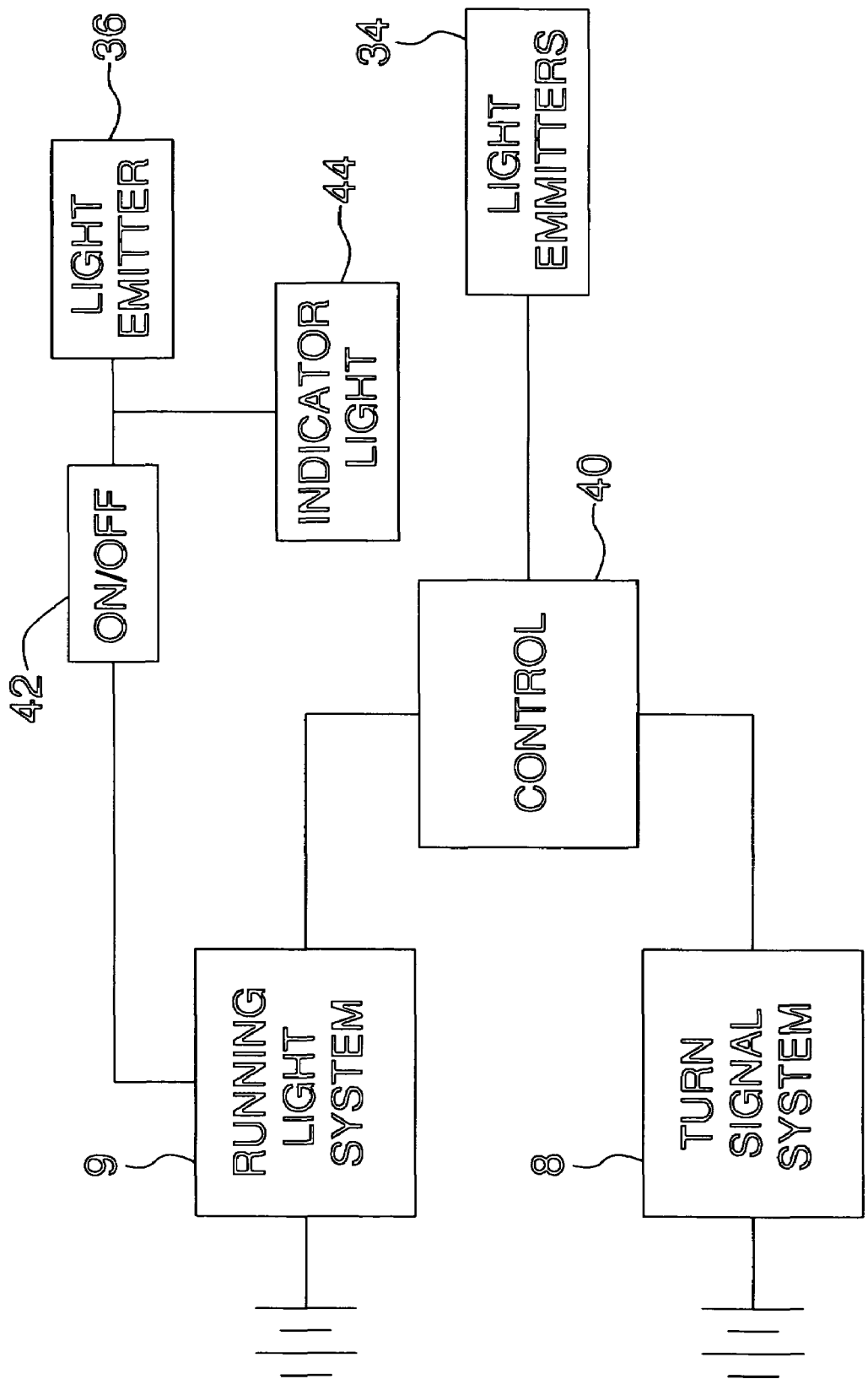

AUXILIARY TRAILER LIGHTING SYSTEM

BACKGROUND OF THE INVENTION

1. Field of the Invention

The present invention relates to trailer lighting devices and more particularly pertains to a new trailer lighting device for illuminated the side of a truck during a turn and for shining lights rearward of a trailer when the truck is moves in reverse.

2. Description of the Prior Art

The use of trailer lighting devices is known in the prior art. U.S. Pat. No. 6,543,917 describes a device for illuminating areas to the side of a trailer. Another type of trailer lighting device is U.S. Pat. No. 6,422,728 that also includes one or more lights mounted to a trailer so that the areas to the sides of the trailer are illuminated. The areas illuminated give the driver an indication of whether or not vehicles near the trailer are behind, or adjacent to the trailer. Another such device for indicating a objects around the perimeter of a trailer is found in U.S. patent application US2003/0107900 A1.

While these devices fulfill their respective, particular objectives and requirements, the need remains for a device that turns on side lights for illuminating areas adjacent to the sides of a trailer near the end of the trailer. Such a system should only be utilized during times of darkness when the lighting system of a semi truck pulling the trailer is being used. Additionally, the system should include additional rearward lighting which may be selectively turned on for illuminating areas behind a trailer.

SUMMARY OF THE INVENTION

The present invention meets the needs presented above by generally comprising a base plate that has a back side and a front side. The back side is attached to a trailer adjacent to and above rear wheels of the trailer. A top wall is attached to the plate and extends outwardly away therefrom. The top wall has first side edge, a second side edge and an outer edge. A lip is attached to and extends downwardly from the outer edge of the top wall. A reflective wall is attached to the lip. The reflective wall extends toward a bottom edge of the base plate such that the reflective wall is angled with respect to the top wall. The reflective wall has a reflective surface facing away from the plate. A translucent covering is removably attached to the lip and extends from the lip and over the reflective wall such that a first compartment is defined between reflective wall and the covering. A plurality of light emitters is provided. At least two of the light emitters is mounted in the first compartment and extends away from the reflective wall. A control is electrically coupled to a turn signal system and a running light system of a truck. The control is electrically coupled to the light emitters mounted in the first compartment. The control is adapted for turning on the light emitters mounted in the first compartment when both of the running light and turn signal systems are turned on.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front in-use view of an auxiliary trailer lighting system according to the present invention.

FIG. 2 is a rear in-use view of the present invention.

FIG. 7 is an electrical schematic view of the present invention.

DESCRIPTION OF THE PREFERRED EMBODIMENT

Figure 3:
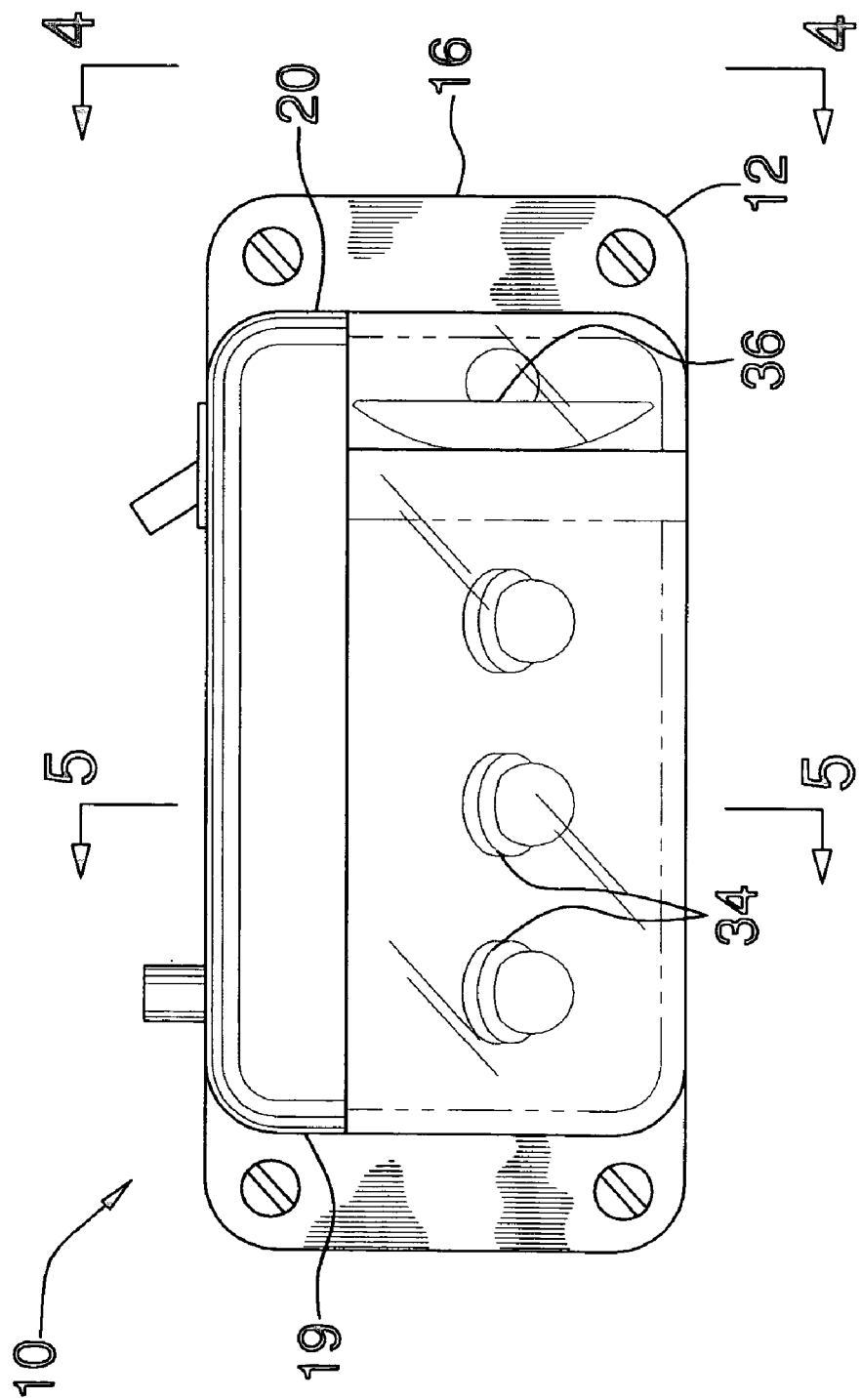
FIG. 3 is a front view of the present invention.
Figure 4:
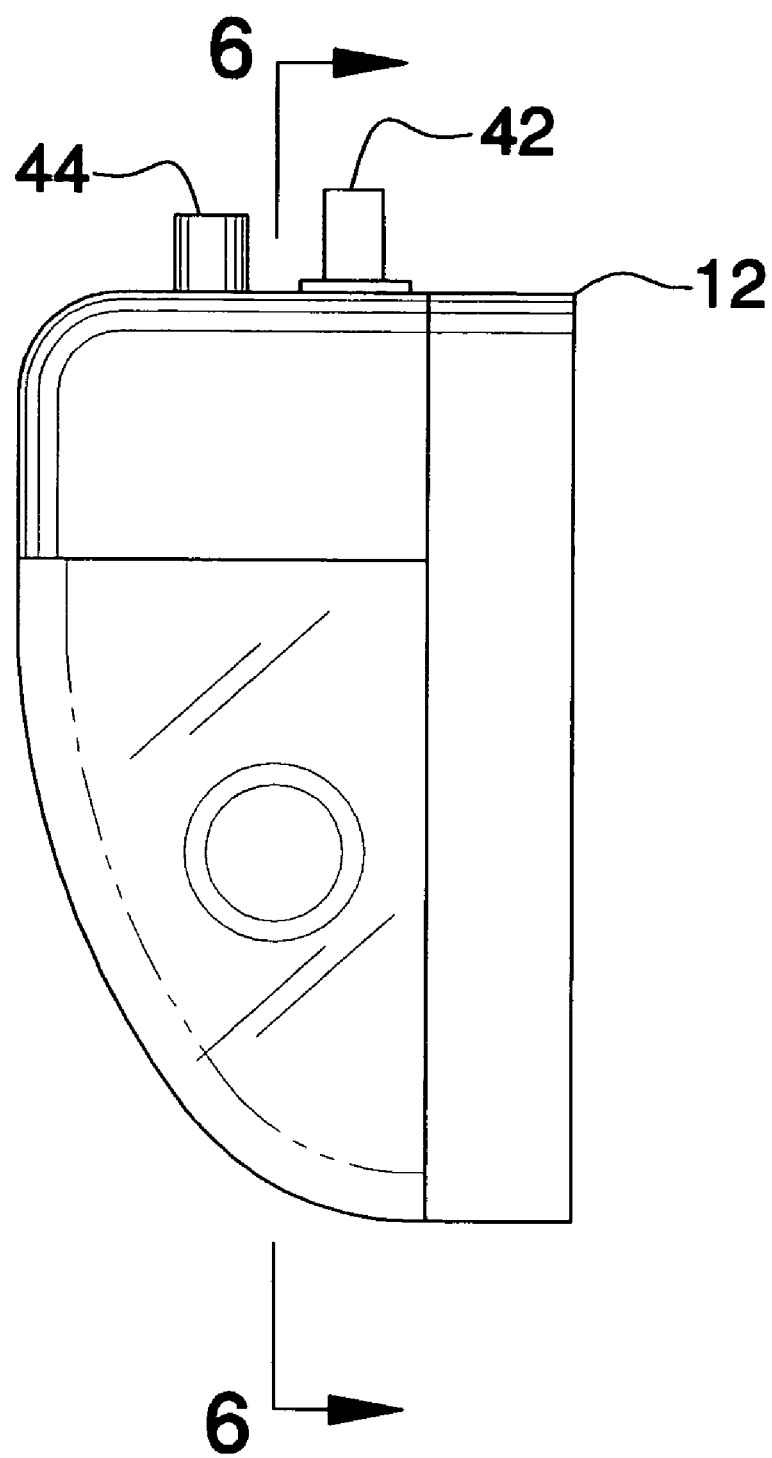
FIG. 4 is a side view of the present invention.

With reference now to the drawings, and in particular to FIGS. 1 through 7 thereof, a new trailer lighting device embodying the principles and concepts of the present invention and generally designated by the reference numeral 10 will be described.

Figure 5:
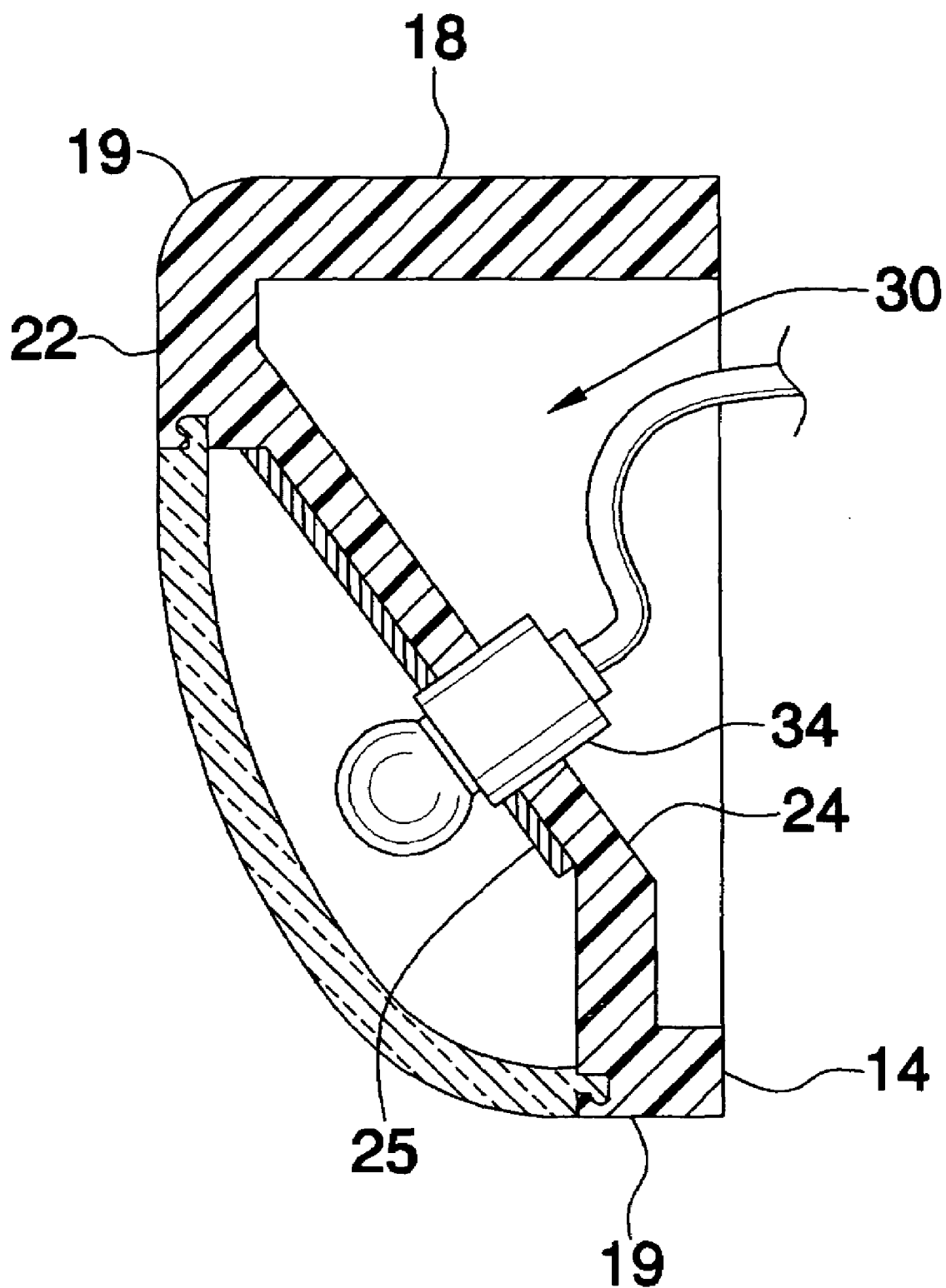
FIG. 5 is a cross-sectional view taken along line 5—5 of FIG. 3 of the present invention.
Figure 6:
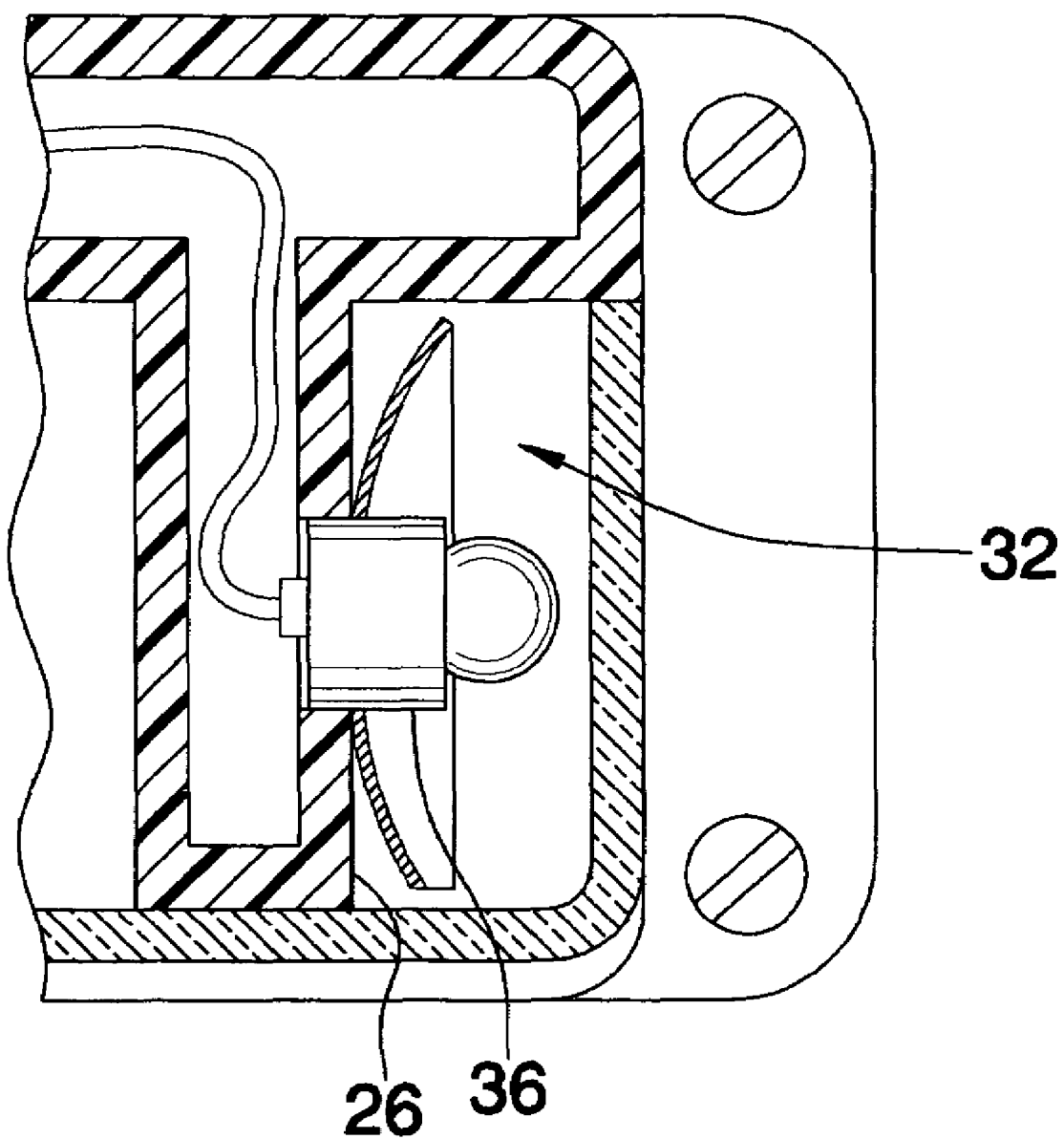
FIG. 6 is a cross-sectional view taken along line 6—6 of FIG. 4 of the present invention.

As best illustrated in FIGS. 1 through 7, the auxiliary trailer lighting system 10 generally comprises a base plate 12 that has a back side 14 and a front side 16. The back side 14 is attached to a trailer 5 a semi truck 6 above and adjacent to the rear wheels of the trailer 5 as shown in FIG. 1. A top wall 18 is attached to the plate 12 and extends outwardly away therefrom. The top wall 18 has first side edge 19, a second side edge 20 and an outer edge 21. A lip 22 is attached to and extends downwardly from the outer edge 21 of the top wall 18. A reflective wall 24 is attached to and extends from the lip 22 and toward a bottom edge 17 of the base plate 12 so that the reflective wall 24 is angled with respect to the top wall 18. The reflective wall 24 extends from the first side edge 19 toward the second side edge 20. The reflective wall 24 has a reflective surface 25, preferably mirrored, that faces downward and away from the plate 12. FIG. 5 shows an aperture extending through the back side 14 for accessing an area beneath the top wall 18.

A vertical wall 26 is attached to and extends downward from the top wall 18. The vertical wall 26 extends from the outer edge 19 to the plate 12 and is positioned between the second side edge 20 and the reflective wall 24.

A translucent covering 28 is removably attached to the lip 22 and extends from the lip 22 and over the reflective wall 24 and the vertical wall 26 so that a first compartment 30 is defined between reflective wall 24 and the covering 28 and a second compartment 32 is defined between the covering 28 and the vertical wall 26. The covering extends to and is removably coupled to the plate 18 along the bottom edge 19. The covering 28 has an amber color where the covering covers the first compartment 30 and the covering 28 is substantially clear where the covering 28 covers the second compartment 32.

A plurality of light emitters is provided. At least two of the light emitters 34 is mounted in the first compartment 30 and extends away from the reflective wall 24. At least one of the light emitters 36 is mounted in the second compartment 32 and extends away from the vertical wall 26. The light emitter 36 in the second compartment 32 is directed rearward of the trailer 5. The light emitters 34, 36 are each relatively high-output light emitters for brightly illuminating area adjacent to the trailer 5.

A control 40 is electrically coupled to a turn signal system 8 and a running light system 9 of the truck 6. The control 40 is electrically coupled to the light emitters 34 mounted in the first compartment 30. The control 40 is adapted for turning on the light emitters 34 mounted in the first compartment 30 when both of the running light 9 and turn signal 8 systems are turned on. Thus, the light emitters 34 are turned on when the turn signal is turned on, but the light emitters 34 do not flash, or strobe, but instead emit a steady light. The control 40 may comprise any conventional control such as a processor, a plurality of micro-switches or a relay circuit.

An actuator 42 is electrically coupled to the light emitter 36 mounted in the second compartment 32 and is adapted for selectively turning the light emitter 36 in the second compartment on or off. The actuator 40 is electrically coupled to the running light system 9 such that power is supplied to the actuator 42 when the running light system 9 is on. The actuator 42 is mounted on the top wall 18.

An indicator light 44 is mounted on the top wall 18 and extends upwardly away therefrom. The indicator light 44 is electrically coupled to the actuator 42. The indicator light 44 is turned on when the actuator 42 is positioned in an on position and the running light system 9 is on.

In use, the light emitters 34, 36 in the first compartment 30 are turned on when a truck driver makes a turn and therefore turns on the turn signal system 8. Since this only occurs when the running light system 9 is turned on, the first compartment 30 light emitters 34 are only turned on when the lights of the truck 6 are turned on. These light emitters 34 illuminate the ground adjacent to the trailer 5 to provide more light for the driver. The first compartment 30 light emitters 32 are wired to the turn signal system 8 so that the side of the trailer 5 being illuminated is the side to which the turn signal system 8 is signaling a turn. For this reason, the system 10 will be utilized in a pair of systems, each attached to opposite sides of the trailer 5 and each electrically coupled to one of the turn signals of the truck 6. The light emitter 36 in the second compartment 32 faces rearward and is preferably turned on manually with the actuator 42. This light emitter 36 provides rearward light for a trailer 5 when being backed up. The indicator light 44 is preferably a red bulb, or light emitting diode, that signals to the driver when the second compartment light emitter is turned on. If a driver is driving forward, such as down a highway, and views the indicator light in their rearview mirror, they will know that they accidentally left the second compartment 32 light emitters 36 on.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An auxiliary illumination system for a semi truck having a trailer, said system comprising:

a base plate having a back side and a front side, said back side being attached to the trailer adjacent to and above rear wheels of the trailer, a top wall being attached to said plate and extending outwardly away therefrom, said top wall having first side edge, a second side edge and an outer edge, a lip being attached to and extending downwardly from said outer edge of said top wall, a reflective wall being attached to said lip, said reflective wall extending toward a bottom edge of said base plate such that said reflective wall is angled with respect to said top wall, said reflective wall having a reflective surface facing away from said plate, said reflective wall extending from said first side edge toward said second side edge;

a vertical wall being attached to and extending downward from said top wall, said vertical wall extending from said outer edge to said plate and being positioned between said second side edge and said reflective wall, said covering extending over said vertical wall such that a second compartment is defined between said vertical wall and said covering;

a translucent covering being removably attached to said lip and extending from said lip and over said reflective wall such that a first compartment is defined between reflective wall and said covering;

a plurality of light emitters, at least two of said light emitters being mounted in said first compartment and extending away from said reflective wall, at least one of said light emitters being mounted in said second compartment and extending away from said vertical wall, said light emitters in said second compartment being directed rearward of the trailer; and a control being electrically coupled to a turn signal system and a running light system of the truck, said control being electrically coupled to said light emitters mounted in said first compartment, wherein said control is adapted for turning on said light emitters mounted in said first compartment when both of said running light and turn signal system is turned on, an actuator being electrically coupled to said light emitter mounted in said second compartment and being adapted for selectively turning such on or off, said actuator being electrically coupled to said running light system such that power is supplied to said actuator when said running light system is on.

2. The auxiliary illumination system according to claim 1, said covering having an amber color where said covering covers said first compartment, said covering being substantially clear where said covering covers said second compartment.

3. The auxiliary illumination system according to claim 1, said covering having an amber color.

4. The auxiliary illumination system according to claim 1, further including an indicator light being mounted on said top wall and extending upwardly away therefrom, said indicator light being electrically coupled to said actuator, wherein said indicator light is turned on when said actuator is positioned in an on position and said running light system is on.

5. An auxiliary illumination system for a semi truck having a trailer, said system comprising:

a base plate having a back side and a front side, said back side being attached to the trailer adjacent to and above rear wheels of the trailer, a top wall being attached to said plate and extending outwardly away therefrom, said top wall having first side edge, a second side edge and an outer edge, a lip being attached to and extending downwardly from said outer edge of said top wall, a reflective wall being attached to said lip, said reflective wall extending from said lip and toward a bottom edge of said base plate such that said reflective wall is angled with respect to said top wall, said reflective wall extending from said first side edge toward said second side edge, said reflective wall having a reflective surface facing away from said plate;

a vertical wall being attached to and extending downward from said top wall, said vertical wall extending from said outer edge to said plate and being positioned between said second side edge and said reflective wall;

a translucent covering being removable attached to said lip and extending from said lip and over said reflective wall and said vertical wall such that a first compartment is defined between reflective wall and said covering and a second compartment is defined between said covering and said vertical wall, said covering having an amber color where said covering covers said first compartment, said covering being substantially clear where said covering covers said second compartment;

a plurality of light emitters, at least two of said light emitters being mounted in said first compartment and extending away from said reflective wall, at least one of said light emitters being mounted in said second compartment and extending away from said vertical wall, said light emitters in said second compartment being directed rearward of the trailer;

a control being electrically coupled to a turn signal system and a running light system of the truck, said control being electrically coupled to said light emitters mounted in said first compartment, wherein said control is adapted for turning on said light emitters mounted in said first compartment when both of said running light and turn signal systems is turned on;

an actuator being electrically coupled to said light emitter mounted in said second compartment and being adapted for selectively turning such on or off, said actuator being electrically coupled to said running light system such that power is supplied to said actuator when said running light system is on; and an indicator light being mounted on said top wall and extending upwardly away therefrom, said indicator light being electrically coupled to said actuator, wherein said indicator light is turned on when said actuator is positioned in an on position and said running light system is on.

* * * * *